(12) United States Patent
Sugitani et al.

(10) Patent No.: US 9,936,124 B2
(45) Date of Patent: Apr. 3, 2018

(54) IMAGING APPARATUS, METHOD FOR CONTROLLING THE SAME, AND STORAGE MEDIUM STORING PROGRAM

(71) Applicant: CANON KABUSHIKI KAISHA, Tokyo (JP)

(72) Inventors: Kuniaki Sugitani, Kawasaki (JP); Takumi Takehara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/237,265

(22) Filed: Aug. 15, 2016

(65) Prior Publication Data

US 2017/0054896 A1 Feb. 23, 2017

(30) Foreign Application Priority Data

Aug. 21, 2015 (JP) .................................. 2015-164015

(51) Int. Cl.
*H04N 5/232* (2006.01)

(52) U.S. Cl.
CPC .............................. *H04N 5/23212* (2013.01)

(58) Field of Classification Search
CPC .................................................. H04N 5/23212
USPC .................................................. 348/345, 349
See application file for complete search history.

(56) References Cited

U.S. PATENT DOCUMENTS

2010/0110178 A1* 5/2010 Isobe ....................... G02B 7/36
348/135
2017/0257555 A1* 9/2017 Li ....................... H04N 5/23212

FOREIGN PATENT DOCUMENTS

JP H08-075999 A 3/1996

* cited by examiner

*Primary Examiner* — Anthony J Daniels
(74) *Attorney, Agent, or Firm* — Canon USA Inc., IP Division

(57) ABSTRACT

An imaging apparatus that performs continuous imaging, includes: a focus detection unit that perform focus detection and calculates an amount of defocus in each of a plurality of imaging operations; a position detection unit that detects an image plane position corresponding to a subject position using the amount of defocus; an estimation unit that estimates a next image plane position using a plurality of pairs of data regarding the image plane position and a time at which the amount of defocus has been detected; and a turnabout determination unit that determines whether a subject is a turnabout subject, which is a subject that moves towards the imaging apparatus, changes direction of movement, and then moves away from the imaging apparatus. The number of pairs of data used for the estimation decreases based on a ratio of a highest image plane speed in past scenes to a current image plane speed.

22 Claims, 8 Drawing Sheets

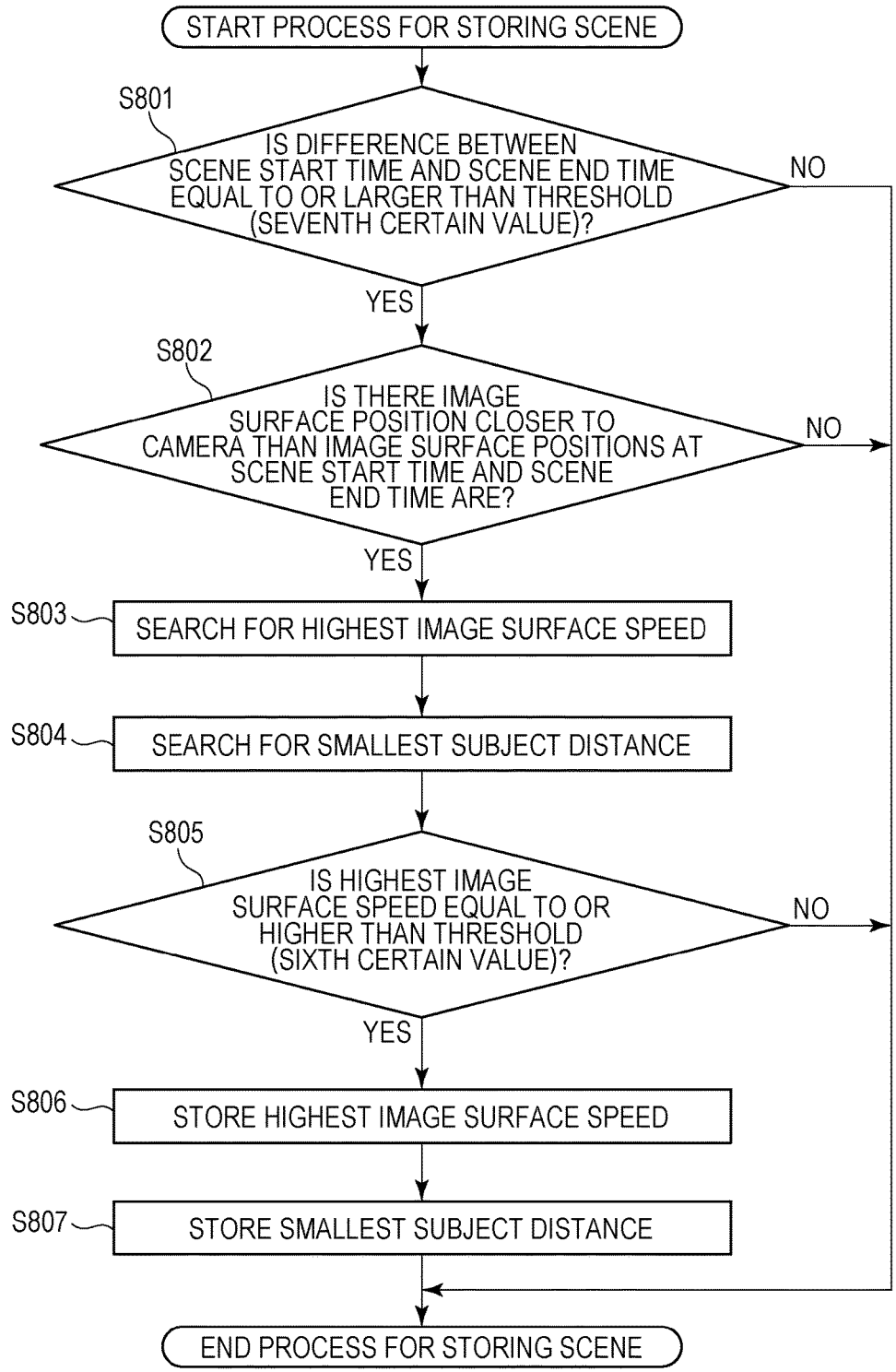

IMAGING APPARATUS, METHOD FOR CONTROLLING THE SAME, AND STORAGE MEDIUM STORING PROGRAM

BACKGROUND OF THE INVENTION

Field of the Invention

The present invention generally relates to an imaging apparatus, and particularly it relates to an imaging apparatus and a method of tracking of a moving object.

Description of Related Art

In continuous imaging, in which a plurality of imaging operations are successively performed, a subject needs to be kept in focus (tracked) in order to obtain in-focus images even when the subject is moving. That is, the tracking refers to driving of an imaging lens in such a way as to keep a moving subject in focus during a continuous imaging operation (e.g., live-view or movie imaging). A method for driving an imaging lens while estimating an image plane position at a time of each imaging operation in order to track a subject is known. In Japanese Patent Application Laid-Open No. 8-75999, a method is disclosed in which an imaging lens is driven between frames (between exposure control operations) on the basis of past results of focus detection before a result of calculation of the focus detecting is obtained.

In Japanese Patent Application Laid-Open No. 8-75999, however, a subject is assumed to be moving towards a camera and the like, and the imaging lens is not driven for a subject whose image plane speed (image plane moving speed) is equal to or higher than a certain value (fast-moving subject). This is because a moving direction of such a subject is likely to reverse or change instantly, and if the imaging lens is driven in the above-described manner, the imaging lens might go past an appropriate focus position.

If the imaging lens is not driven for a fast-moving subject before the focus detection for a next imaging operation and is driven only in a short period of time from completion of the focus detection to an imaging operation, it becomes difficult for the imaging lens to accurately track a fast moving subject. If the imaging lens does not appropriately track the subject, the subject might be out of focus in the imaging operation. It is therefore desirable to improve the tracking accuracy of the imaging lens, in particular, for tracking a moving subject that unexpectedly reverses or changes its moving direction.

SUMMARY OF THE INVENTION

The present invention provides an imaging apparatus that offers a higher tracking accuracy of an imaging lens during continuous imaging than conventional tracking of the related art. The present invention also provides a method for controlling the imaging apparatus, and a storage medium storing a program.

The present invention discloses an imaging apparatus that performs continuous imaging, in which a plurality of imaging operations are successively performed, and tracking in such operations is accurately maintained. According to at least one embodiment of the present invention, an imaging apparatus includes: a focus detection unit configured to perform focus detection, in which an amount of defocus is detected, a position detection unit configured to detect an image plane position corresponding to a subject position using the amount of defocus, an estimation unit configured to estimate a next image plane position using a plurality of pairs of data regarding the image plane position and a time at which the amount of defocus has been detected, and a turnabout determination unit configured to determine whether a subject is a turnabout subject, which is a subject that moves towards the imaging apparatus, changes direction of movement, and then moves away from the imaging apparatus, wherein, if the turnabout determination unit determines that the subject is a turnabout subject, the estimation unit takes more into account latest data than when the turnabout determination unit has determined that the subject is not a turnabout subject.

In addition, the present invention discloses an imaging apparatus that performs continuous imaging, in which a plurality of imaging operations are successively performed. According to an embodiment of the present invention, an imaging apparatus includes: a focus detection unit configured to perform focus detection and to calculate an amount of defocus, a position detection unit configured to detect an image plane position corresponding to a subject position using the amount of defocus, a speed detection unit configured to detect an image plane speed corresponding to a speed of the subject, a storage unit configured to store, as a first speed, a higher one of a plurality of image plane speeds at times of a plurality of successive operations of the focus detection in a period in which the first control member is operated, and a turnabout determination unit configured to determine whether the subject is a turnabout subject, which is a subject that moves towards the imaging apparatus, changes direction of movement, and then moves away from the imaging apparatus, wherein, if a ratio of the first speed at a time of one of the plurality of successive operations of the focus detection in past in which the first control member is operated to a current image plane speed is within a first range, the turnabout determination unit determines that the subject is a turnabout subject, and if the ratio is outside the first range, the turnabout determination unit determines that the subject is not a turnabout subject.

Further features of the present invention will become apparent to those skilled in the art from the following detailed description of exemplary embodiments with reference to the attached drawings.

BRIEF DESCRIPTION OF THE DRAWINGS

FIG. 8 is a flowchart illustrating a process for storing a scene according to the first embodiment.

DESCRIPTION OF THE EMBODIMENTS

Embodiments of the present invention will be described in detail with reference to the accompanying drawings. In first and second embodiments, the present invention is applied to a digital single-lens reflex (SLR) camera, as an example of an imaging apparatus. However, the principles described in the first and second embodiments also apply to other imaging apparatuses, such as, for example, a digital video camera or even a point-and-shoot camera with live-view and video recording capabilities.

First Embodiment

Figure 1:
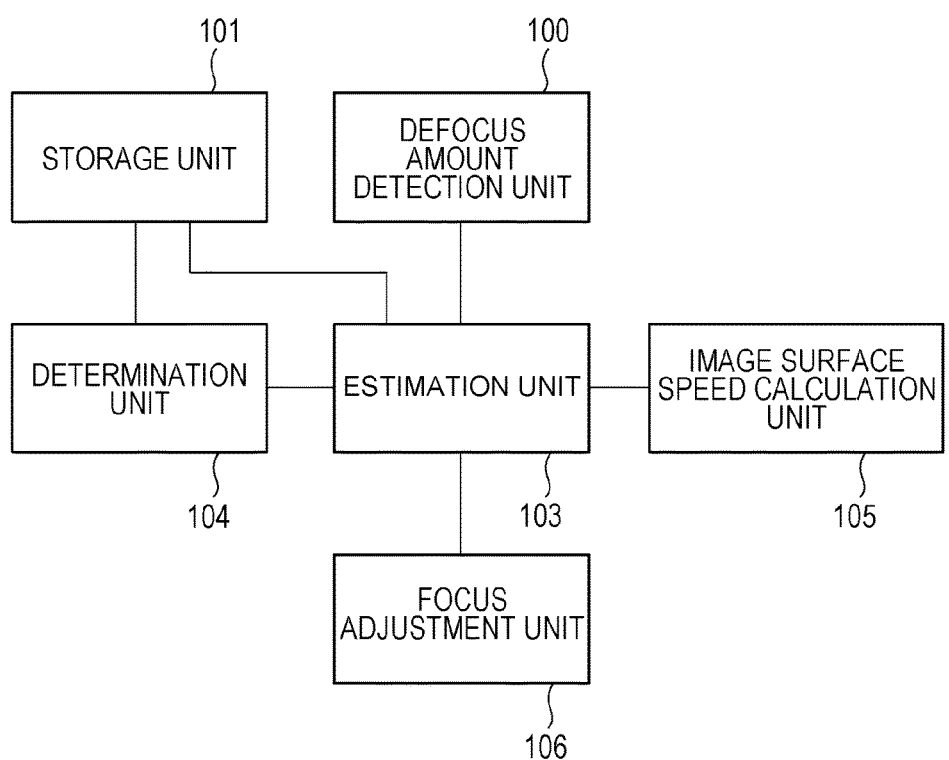
FIG. 1 is a block diagram illustrating a concept of a first embodiment of the present invention.

FIG. 1 is a block diagram illustrating a concept of an imaging apparatus according to the first embodiment of the present invention.

A defocus amount detection unit (focus detection unit) 100 detects the amount of defocus at a plurality of coordinates on an imaging screen. More specifically, the defocus amount detection unit 100 is a microcomputer 224 (described later).

A storage unit 101 stores a plurality of image plane positions obtained by the microcomputer 224 (position detection unit) on the basis of the amount of defocus detected by the defocus amount detection unit 100 and image formation positions of an imaging lens 201 and a plurality of times at which the amount of defocus has been detected. The storage unit 101 also stores image plane speeds obtained by an image plane speed calculation unit (speed detection unit) 105 (described later). More specifically, the storage unit 101 is a memory 221. The image plane positions in the present embodiment refer to positions of focus at a time when the imaging lens 201 is located at focusable positions. The image plane speeds refer to speeds at which the image plane positions move.

An estimation unit 103 estimates a next image plane position using an image plane position, a time at which the image plane position has been detected (as a result of focus detection), and a plurality of past image plane positions and a plurality of times at which the past image plane positions have been detected stored in the storage unit 101. More specifically, the estimation unit 103 is the microcomputer 224.

The determination unit 104 determines a relationship between a first estimated image plane position obtained by the estimation unit 103 after the defocus amount detection unit 100 detects the amount of defocus and a second estimated image plane position obtained by the estimation unit 103 immediately after a previous frame is imaged. More specifically, the determination unit 104 is the microcomputer 224.

The image plane speed calculation unit (speed detection unit) 105 calculates an image plane speed on the basis of an image plane position detected by the defocus amount detection unit 100, a time at which the image plane position has been detected, and past image plane positions and times at which the past image plane positions have been detected stored in the storage unit 101. More specifically, the image plane speed calculation unit 105 is the microcomputer 224.

A focus adjustment unit 106 adjusts focus on the basis of an estimated next image plane position estimated by the estimation unit 103. More specifically, the focus adjustment unit 106 is a lens driving circuit 202 (described later).

Figure 2:
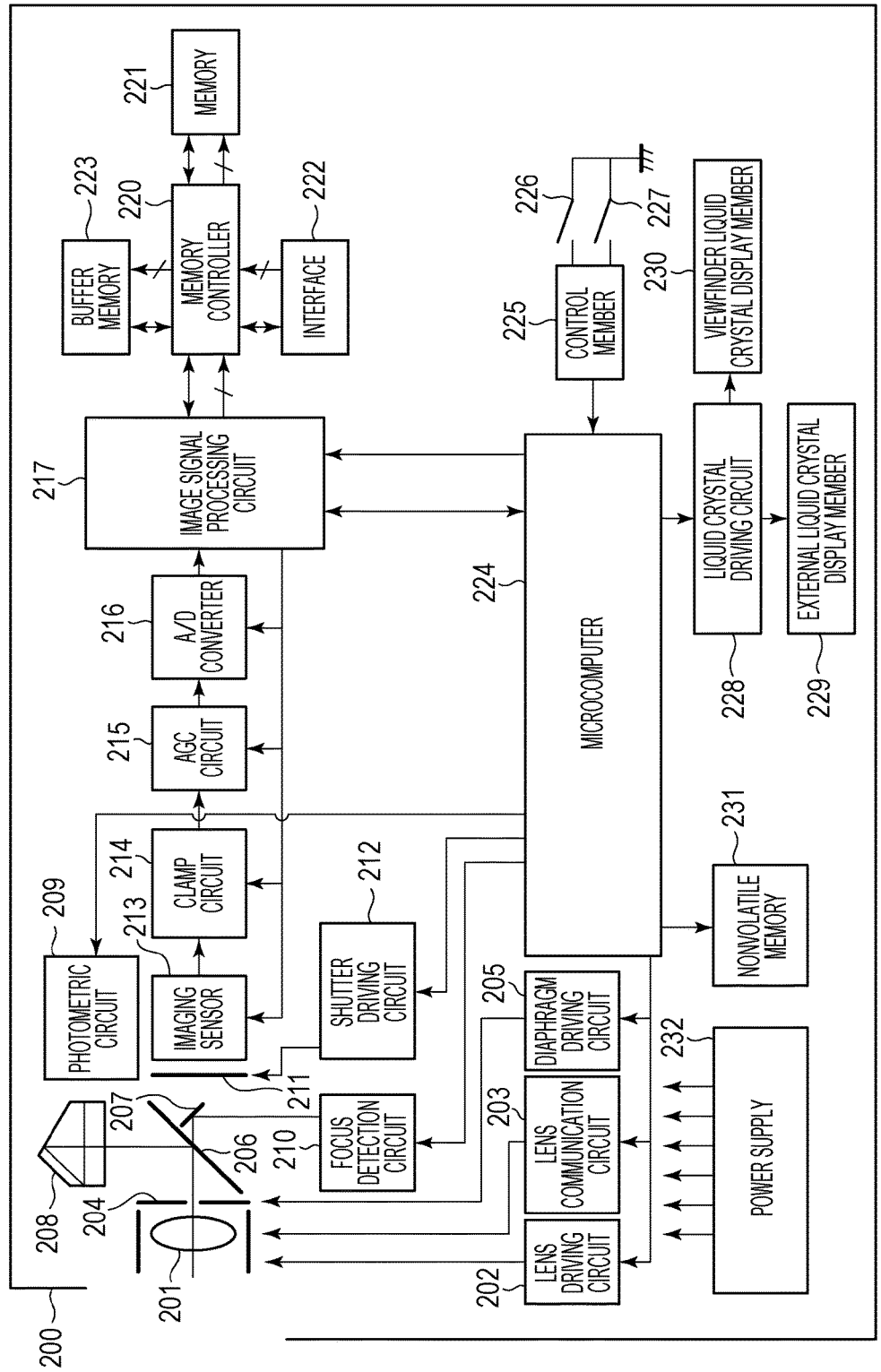
FIG. 2 is a block diagram illustrating the configuration of a digital single-lens reflex camera according to the first embodiment.

Next, the digital single-lens reflex camera in the present embodiment to which the present invention is applied will be described. FIG. 2 is a block diagram illustrating the configuration of the digital single-lens reflex camera.

A lens of the imaging apparatus in the present invention is replaceable, and an interchangeable lens including the imaging lens 201 is removably attached to a camera 200.

The imaging lens 201 is driven by a lens driving circuit 202 (lens driving unit). The lens driving circuit 202, for example, includes a direct-current (DC) motor or a stepping motor. The lens driving circuit 202 adjusts the focus by changing a focus lens position of the imaging lens 201 through control performed by the microcomputer 224 included in the camera 200.

A lens communication circuit 203 communicates with a microcomputer (not illustrated) included in the imaging lens 201. The microcomputer 224 controls the communication and obtains a state of the imaging lens 201 through the communication.

A diaphragm 204 includes a plurality of diaphragm blades for adjusting the amount of light incident on the imaging lens 201.

A diaphragm driving circuit 205 drives the diaphragm 204. The microcomputer 224 calculates the amount of driving. The diaphragm driving circuit 205 drives the diaphragm 204 by the amount of driving to change an optical aperture ratio and adjust the amount of light incident on the imaging lens 201.

A main mirror 206 directs a light beam incident from the imaging lens 201 to a viewfinder or an imaging sensor 213. The main mirror 206 normally reflects the light beam to the viewfinder, but during imaging, flips up and moves away from an optical axis to let the light beam enter the imaging sensor 213. The imaging sensor 213 is a charge-coupled device (CCD), a complementary metal-oxide-semiconductor (CMOS) sensor, or the like and converts a subject image formed by the imaging lens 201 into an electrical signal.

The main mirror 206 is a half mirror and passes part of a light beam received by a central portion thereof. A sub-mirror 207 reflects the light beam that has passed through the main mirror 206 to a focus detection sensor (not illustrated) for performing focus detection included in a focus detection circuit 210. The focus detection in the present embodiment refers to calculation of the amount of defocus on the basis of an output of the focus detection sensor (not illustrated) calculated by the microcomputer 224. The microcomputer 224 evaluates the amount of defocus as a result of the calculation (a result of the focus detection) and issues an instruction to the lens driving circuit 202 to drive a focus lens.

The viewfinder includes a pentaprism 208, a ground glass (not illustrated), and an eyepiece (not illustrated). A photometric sensor (provided in a photometric circuit 209) including a color filter converts the color and brightness of a subject image formed on the ground glass (not illustrated) into an electrical signal.

A shutter driving circuit 212 drives a focal-plane shutter 211. The microcomputer 224 controls the length of time for which the focal-plane shutter 211 remains open.

A clamp circuit 214 and an automatic gain control (AGC) circuit 215 perform basic analog signal processing prior to analog-to-digital (A/D) conversion. The microcomputer 224 changes a clamp level and an AGC reference level.

An A/D converter 216 converts an analog signal output from the imaging sensor 213 into a digital signal.

An image signal processing circuit 217 performs a filtering process, a color conversion process, and a gamma process on digitized image data as well as a compression process such as Joint Photographic Experts Group (JPEG), and outputs the image data to a memory controller 220. The image signal processing circuit 217 is capable of outputting information regarding the exposure and white balance of the signal output from the imaging sensor 213 to the microcomputer 224 as necessary. The microcomputer 224 issues instructions regarding the white balance and gain adjustment on the basis of this information. In the case of a continuous imaging operation, unprocessed imaging data is temporarily stored in a buffer memory 223 and then read through the memory controller 220, and the image signal processing circuit 217 performs image processing and a compression process. The number of images successively captured depends on the size of the buffer memory 223.

The memory controller 220 stores the unprocessed digital image data input from the image signal processing circuit 217 in the buffer memory 223 and the processed digital image data in the memory 221. The memory controller 220 also outputs image data to the image signal processing circuit 217 from the buffer memory 223 or the memory 221. The memory 221 might be removable. The memory controller 220 is capable of outputting an image stored in the memory 221 through an external interface 222 that can be connected to a computer or the like. The image signal processing circuit 217 is achieved by a logic device such as a gate array.

A control member 225 transmits a state thereof to the microcomputer 224, and the microcomputer 224 controls each component in accordance with the state of the control member 225. The control member 225 includes a switch 226 (hereinafter also referred to as an "SW1" or a "first control member") and a switch 227 (hereinafter also referred to as an "SW2" or a "second control member"), which are input switches.

The SW1 and the SW2 are switches that turn ON or OFF in accordance with an operation performed on a release button. When the release button is half-pressed, only the SW1 is turned ON, and an autofocus operation and a photometric operation are performed. When the release button is fully pressed, both the SW1 and the SW2 are turned ON, and an image is recorded. Imaging is performed in this state. When both the SW1 and the SW2 are ON, a continuous imaging operation is performed.

The control member 225 is also connected to buttons that are not illustrated, such as an International Standards Organization (ISO) setting button, an image size setting button, an image quality setting button, and an information display button. States of these buttons are detected by the microcomputer 224.

A liquid crystal driving circuit 228 drives an external liquid crystal display member 229 and a viewfinder liquid crystal display member 230 in accordance with display content commands from the microcomputer 224. The viewfinder liquid crystal display member 230 is provided with a backlight that is not illustrated, such as a light-emitting diode (LED), which is driven by the liquid crystal driving circuit 228. The microcomputer 224 is capable of checking the capacity of the memory 221 through the memory controller 220 on the basis of data regarding an estimated image size according to ISO sensitivity, image size, and image quality set before imaging and calculating the number of images that can be captured. The microcomputer 224 may display the number of images that can be captured on the external liquid crystal display member 229 or the viewfinder liquid crystal display member 230 as necessary.

Data can be saved in a nonvolatile memory 231 (electrically erasable programmable read-only memory (EEPROM)) even when the camera is turned OFF.

A power supply 232 supplies necessary power to each integrated circuit (IC) and driving system.

Operation Example of Imaging Process

Next, an operation example of an imaging process according to the first embodiment of the present invention will be described with reference to a flowchart of FIG. 3. In the present embodiment, it is assumed that the imaging lens 201 performs continuous imaging while tracking a subject even when the subject reverses its moving direction (hereinafter also referred to as a "turnabout subject") whose moving speed is high and that moves towards the camera and the like, turns about, and then moves away from the camera and the like. The continuous imaging in the present embodiment refers to a plurality of successive imaging operations for obtaining recorded images. In the continuous imaging described below, two imaging operations during the continuous imaging will be focused upon in order to clarify a relationship between a certain imaging operation, which will be referred to as a "first imaging operation", and a next imaging operation, which will be referred to as a "second imaging operation".

In general, a camera includes a first mode (one-shot imaging mode) in which the imaging lens 201 is driven on the basis of an image plane position corresponding to a subject position at a certain point in time, and a second mode (servo imaging mode) in which the imaging lens 201 is driven while estimating a next image plane position corresponding to a subject position. In the first embodiment, the camera enters the servo imaging mode (also referred to as an "estimation imaging mode") and performs continuous imaging.

In step S301, the state of the SW1 is determined. If the SW1 is ON (YES at S301), the process proceeds to step S302. A case in which it is determined that the SW1 is OFF, the process proceeds to step S307 which will be described later.

In a process for detecting the focus in step S302, the focus detection sensor (not illustrated) is driven to obtain the amount of defocus. Furthermore, in step S302, a current image plane position is obtained. The image plane position corresponding to the subject position and a time at which the image plane position has been detected are stored in the memory 221 as a set of information for a post-imaging estimation process and a process for storing a scene, which will be described later. After the process for detecting the focus is completed, the process proceeds to step S303.

In step S303, a pre-imaging estimation process is performed. In the pre-imaging estimation process, the image plane position at a time of an imaging operation is estimated after the focus detection (step S302) but before the next imaging operation (step S305) on the basis of the latest result and past results of the process for detecting the focus. The imaging lens 201 is driven to adjust the focus on the basis of a result of the pre-imaging estimation process. Details will be described later with reference to a sub-flowchart of FIG. 4.

In step S304, the state of the SW2 is determined. If the SW2 is OFF, the process returns to step S301, and the state of the SW1 is determined again. If the SW2 is OFF and the SW1 is ON, steps S301 to S304 are repeated.

If it is determined in step S304 that the SW2 is ON (YES at S304), that is, if the release button is fully pressed and both the SW1 and the SW2 are ON, the process proceeds to step S305 to perform imaging. In step S305, the main mirror 206 flips up, and the focal-plane shutter 211 operates to perform imaging (first imaging operation).

In step S306, the post-imaging estimation process is performed. In the post-imaging estimation process, the image plane position at a time of a next imaging operation is estimated after the imaging (first imaging operation) but before a next process for detecting the focus on the basis of the latest result and the past results of the process for detecting the focus. The imaging lens 201 is driven on the basis of a result of the post-imaging estimation process, that is, the estimated image plane position at the time of the next imaging operation. Details will be described later with reference to a sub-flowchart of FIG. 5.

After the post-imaging estimation process, when step S306 is completed, the process returns to step S301.

If it is determined in step S301 that the SW1 is OFF, the process proceeds to step S307. In step S307, it is determined whether the SW1 or the SW2 has been turned ON immediately before step S307. That is, it is determined whether the SW1 is turned OFF after the SW1 is temporarily turned ON and the processing in step S302 and later is performed or the SW1 has remained OFF (the processing in step S302 and later has not been performed). If the SW1 or the SW2 has been turned ON immediately before S307, that is, if the SW1 is turned OFF after the SW1 is temporarily turned ON and the processing in step S302 and later is performed, the process proceeds to the process for storing a scene in step S308. If the SW1 or the SW2 has not been turned ON immediately before step S307, that is, if the SW1 has remained OFF (the processing in step S302 and later has not been performed), the process returns to step S301 and waits until the SW1 is turned ON.

In step S308, the process for storing a scene is performed. The scene in the present embodiment refers to information (data) obtained during a period of time for which the SW1 remains ON. In other words, the scene refers to data related to image plane position and subject distance and speed acquired during a period of time for which the focus is continuously detected. If both the SW1 and the SW2 are ON, that is, during continuous imaging, the focus detection and the imaging are alternately performed. If only the SW1 is ON, the imaging is not performed, and the focus is continuously detected. Details of the process for storing a scene will be described later with reference to FIG. 8.

Figure 3:
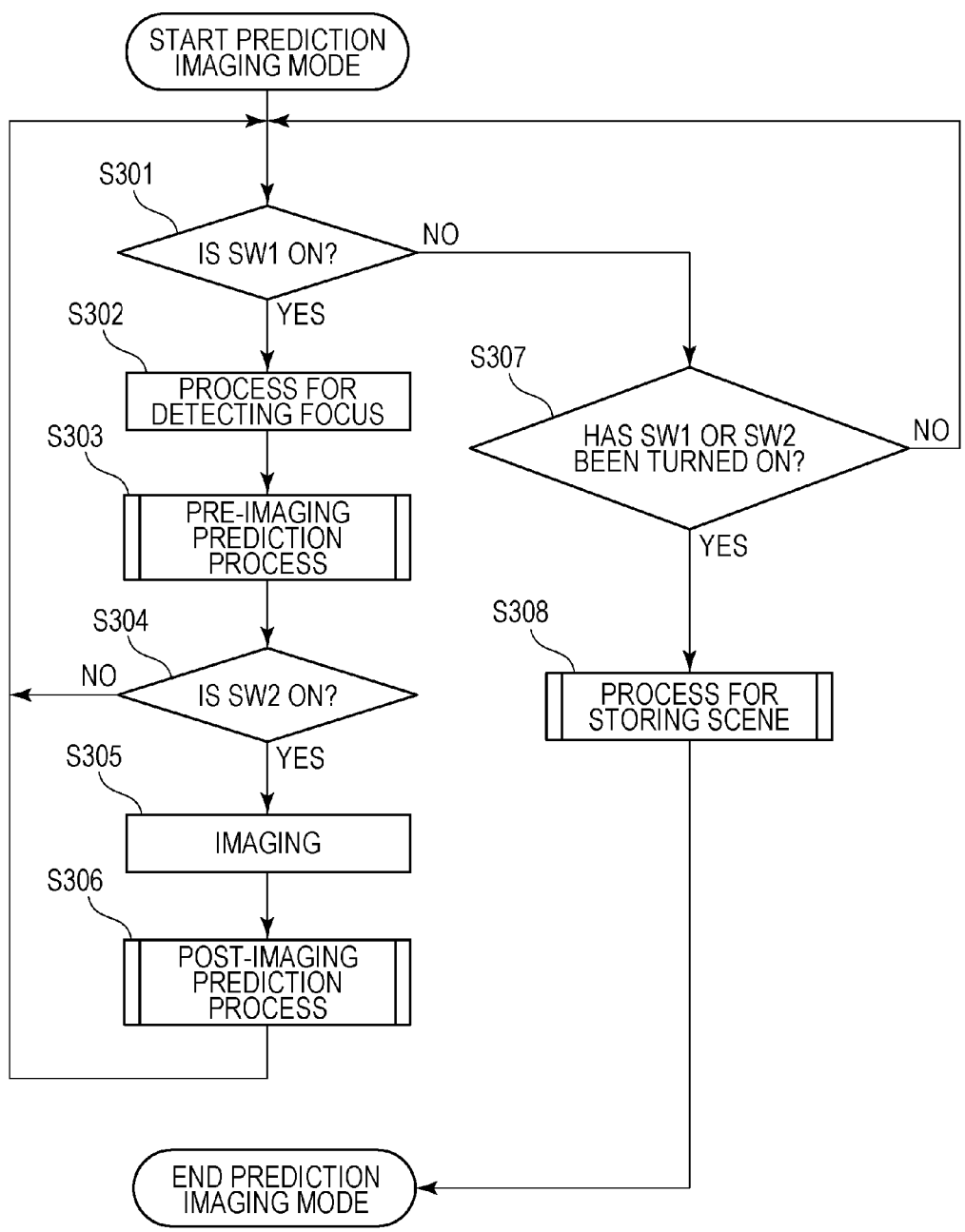
FIG. 3 is a flowchart illustrating an estimation imaging mode (servo imaging mode) according to the first embodiment.

The operation illustrated in the flowchart of FIG. 3 may be repeated until a user terminates the servo imaging mode (estimation imaging mode) of the camera.

Pre-Imaging Estimation Process

Figure 4:
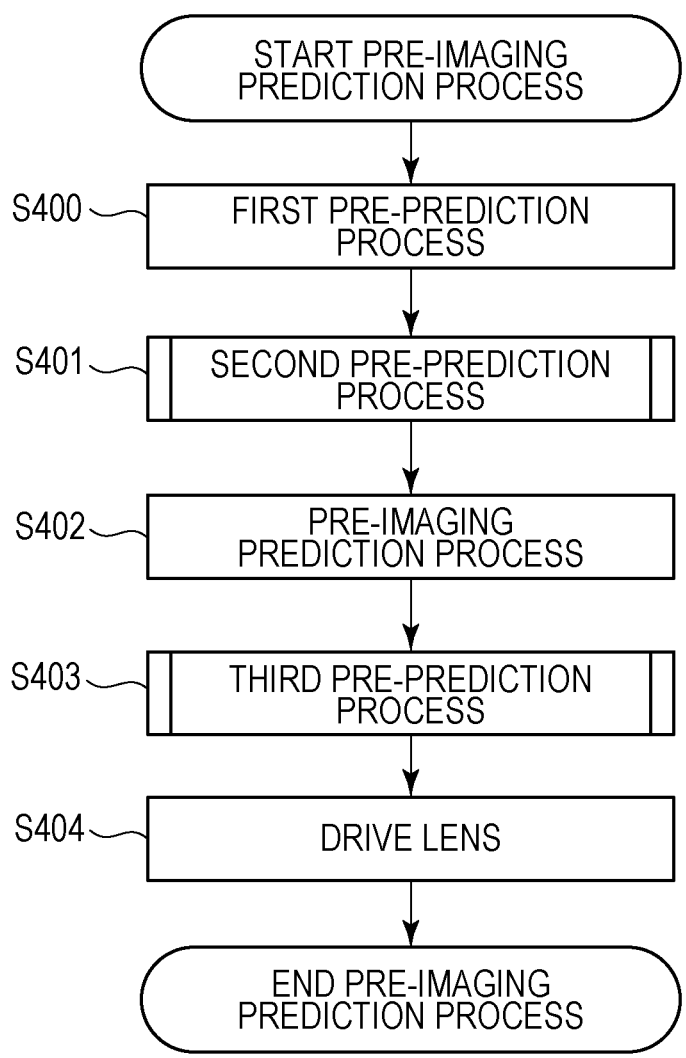
FIG. 4 is a flowchart illustrating a pre-imaging estimation process according to the first embodiment.

Next, an operation example of the pre-imaging estimation process in step S303 will be described with reference to the sub-flowchart of FIG. 4. The pre-imaging estimation process in step S303 is performed after the process for detecting the focus in step S302 but before the imaging in step S305.

In step S400, the microcomputer 224 performs a first pre-estimation process. The first pre-estimation process determines a number of pairs of data (the image plane position corresponding to the subject position and the time at which the image plane position has been detected) to be used for the pre-imaging estimation process in step S402. That is, a pair of data (two data sets) includes the image plane position corresponding to the subject position and the time at which the image plane position has been detected. The number of pairs of data is determined by a known method. For example, the number of pairs of data is determined on the basis of the image plane speed of the subject; that is, the amount of pairs of data can be determined on the basis of the moving speed of the subject.

In step S401, the microcomputer 224 (first estimation unit) performs a second pre-estimation process. The second pre-estimation process is performed for the post-imaging estimation process (step S306), which will be described later, and determines the number of pairs of data (the image plane position corresponding to the subject position and the time at which the image plane position has been detected) to be used for the post-imaging estimation process. Details will be described later with reference to a sub-flowchart of FIG. 6.

In the pre-imaging estimation process in step S402, the microcomputer 224 (first estimation unit) estimates the image plane position corresponding to the subject position at the time of the next imaging operation (first imaging operation) using the data, the number of which has been determined in the first pre-estimation process in step S400. In the estimation, the image plane position corresponding to the subject position and the time at which the image plane position has been detected that have just been obtained in step S302 (the process for detecting the focus) and a plurality of pairs of data (the image plane position corresponding to the subject position and the time at which the image plane position has been detected), which are stored in the memory 221, obtained as a result of the process for detecting the focus in the past. The microcomputer 224 estimates the image plane position corresponding to the subject position at a time of imaging of a next frame.

In step S403, the microcomputer 224 performs a third pre-estimation process. In the third pre-estimation process, as in the second pre-estimation process, the number of pairs of data (the image plane position corresponding to the subject position and the time at which the image plane position has been detected) to be used for the post-imaging estimation process (step S306) is determined. Details will be described later with reference to a sub-flowchart of FIG. 7.

In step S404, the imaging lens 201 is driven. The imaging lens 201 is driven on the basis of the image plane position corresponding to the subject position at the time of the imaging operation (first imaging operation) estimated in the pre-imaging estimation process in step S402.

In the present embodiment, the second pre-estimation process (step S401) and the third pre-estimation process (step S403) are performed during the pre-imaging estimation process (step S303). The second pre-estimation process (step S401) and the third pre-estimation process (step S403), however, may be performed at other timings before the post-imaging estimation process (step S501) because the second pre-estimation process (step S401) and the third pre-estimation process (step S403) are processes performed for the post-imaging estimation process (step S501).

Post-Imaging Estimation Process

Next, an operation example of the post-imaging estimation process in step S306 will be described with reference to the sub-flowchart of FIG. 5. The post-imaging estimation process in step S306 is performed after the imaging operation (first imaging operation) in step S305 but before the next process for detecting the focus.

In the post-imaging estimation process in step S501, the microcomputer 224 (second estimation unit) estimates the image plane position corresponding to the subject position at the time of the next imaging operation (second imaging operation) using data (the image plane position corresponding to the subject position and the time at which the image plane position has been detected), the number of which has been determined in the second pre-estimation process or the third pre-estimation process. Details of the second pre-estimation process and the third pre-estimation process will be described later.

In the estimation, data (stored in the memory 221) regarding the image plane position corresponding to the subject position and the time at which the image plane position has been detected obtained from a plurality of processes for detecting the focus in the past including the process for detecting the focus in step S302 (previous process for detecting the focus) is used. The microcomputer 224 estimates the image plane position corresponding to the subject position at a time of imaging of a next frame. That is, the microcomputer 224 estimates the image plane position corresponding to the subject position at a certain point in time (a time of the second imaging operation), which is also estimated by a next pre-imaging estimation process.

In step S502, the imaging lens 201 is driven on the basis of a result of the post-imaging estimation process in step S501. That is, the imaging lens 201 is driven on the basis of the image plane position corresponding to the subject position (an estimated image plane position corresponding to the subject position) at the next imaging operation (second imaging operation).

Second Pre-Estimation Process

Figure 6:
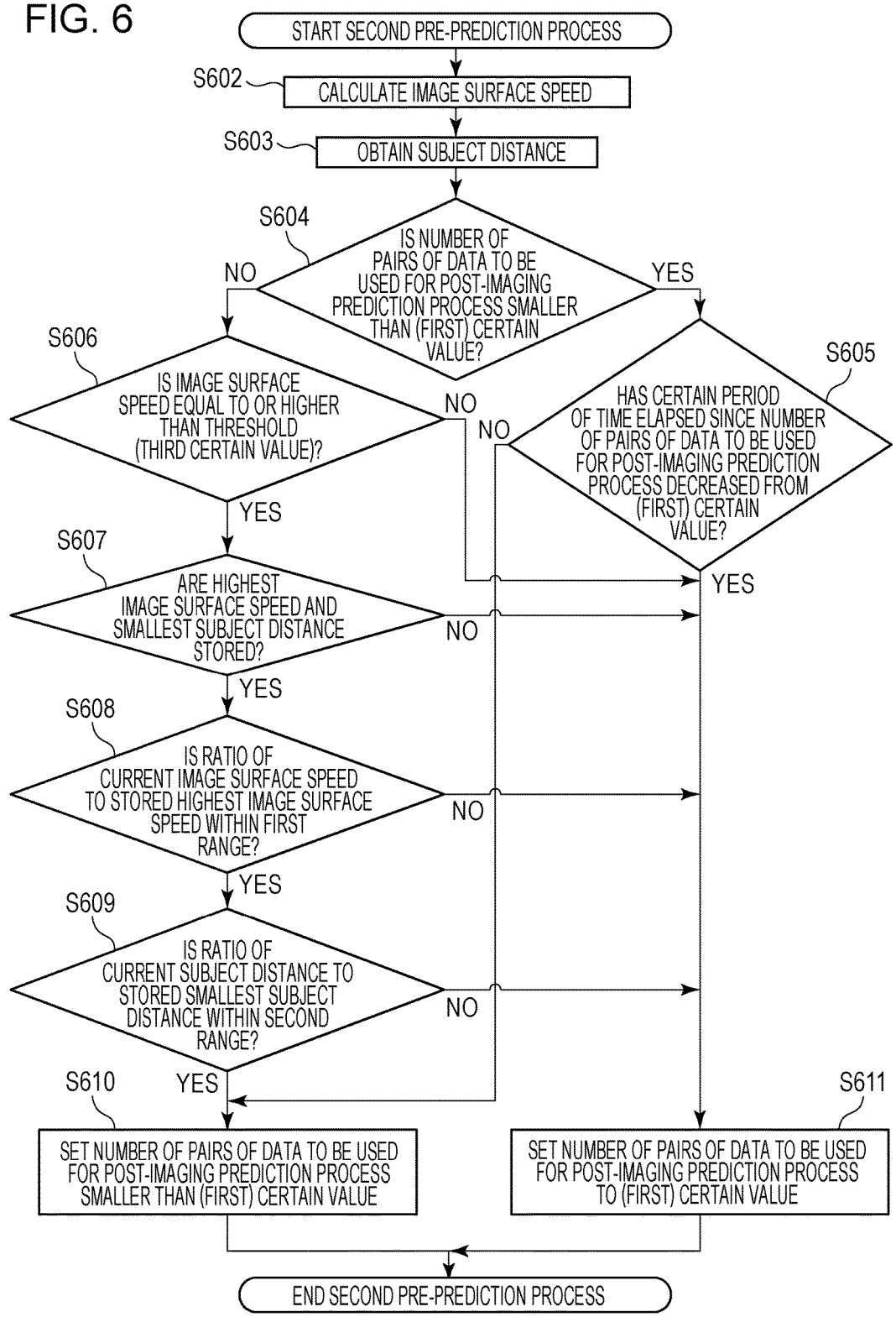
FIG. 6 is a flowchart illustrating a second pre-estimation process according to the first embodiment.

Next, an operation example of the second pre-estimation process in step S401 will be described with reference to the sub-flowchart of FIG. 6. The second pre-estimation process is performed for the post-imaging estimation process. In the second pre-estimation process, the number of pairs of data regarding the image plane position corresponding to the subject position and the time at which the image plane position has been detected to be used for the post-imaging estimation process (step S306) is determined on the basis of results of reference to the data regarding past scenes. A process for storing scene data (the process for storing a scene in step S308) to be referred to in the second pre-estimation process will be described later.

In step S602, the microcomputer 224 (speed detection unit) calculates an image plane speed corresponding to the moving speed of the subject. The image plane speed is calculated from data regarding the image plane position corresponding to the subject position obtained from a plurality of processes for detecting the focus in the past including the previous process for detecting the focus, the image plane position of the subject, and the time at which the image plane position has been detected (step S302). The data regarding the image plane position corresponding to the subject position and the time at which the image plane position has been detected is stored in the memory 221.

Any number of pairs of data regarding the image plane position corresponding to the subject position and the time at which the image plane position has been detected may be used here. The calculated image plane speed is associated with the image plane position corresponding to the subject position obtained in the process for detecting the focus (step S302) and the time at which the image plane position has been detected and stored in the memory 221.

In step S603, the microcomputer 224 (distance detection unit) obtains a subject distance (a distance to the subject). A distance to a position at which the imaging lens 201 is forming an image may be used as an estimated subject distance, or a distance to the image plane position corresponding to the subject position obtained in the process for detecting the focus (step S302) may be used as the subject distance.

In step S604, the microcomputer 224 (data count determination unit) determines whether the number of pairs of data to be used for the post-imaging estimation process has been set smaller than a certain value (first certain value) in a current scene. If the number of pairs of data (set in the second pre-estimation process or the third pre-estimation process in the current scene) is smaller than the certain value, the process proceeds to step S605. Step S605 will be described later. If the number of pairs of data is not smaller than the certain value, that is, if the number of pairs of data remains at the certain value, the process proceeds to step S606.

In step S606, the microcomputer 224 (image plane speed determination unit) determines whether the image plane speed is equal to or higher than a threshold (third certain value). If the image plane speed is lower than the threshold, it is assumed that the subject is moving slowly. When the subject is moving slowly, the imaging lens 201 can easily track the subject compared to when the subject is moving fast. If the microcomputer 224 determines that the image plane speed is not equal to or higher than the threshold, therefore, the process proceeds to step S611. The microcomputer 224 keeps the number of pairs of data to be used for the post-imaging estimation process at the certain value (first certain value).

On the other hand, if the image plane speed is equal to or higher than the threshold (third certain value), it is assumed that the subject is moving fast. If the subject is moving towards the camera and turning about (turnabout subject), the imaging lens 201 might not be able to track the subject because, when the number of pairs of data to be used for the post-imaging estimation process is large, an error in the estimation might become large. If the image plane speed is equal to or higher than the threshold (third certain value), therefore, the process proceeds to step S607 to determine whether the subject is moving towards the camera and turning about.

In step S607, the microcomputer 224 (storage determination unit) determines whether the memory 221 stores a highest image plane speed (first speed) of subjects and a smallest subject distance (first distance) in the past scenes. Subjects that have achieved the highest image plane speed and the smallest subject distance stored in the memory 221 are turnabout subjects that satisfy a certain condition (described later). If the highest image plane speed of the subjects and the smallest subject distance in the past scenes are stored in the memory 221, the process proceeds to step S608 to make a comparison with the current subject. If the highest image plane speed of the subjects and the smallest subject distance in the past scenes are not stored, the process proceeds to step S611, and the number of pairs of data to be used for the post-imaging estimation process remains at the certain value (first certain value). This is because if data regarding the subjects in the past scenes is not stored, it is difficult to compare the movement of the current subject with the movement of the past subjects.

In step S608, the microcomputer 224 (speed comparison unit) obtains a ratio of the highest image plane speed stored in the process for storing a scene (step S308) in the past scenes to the image plane speed of the current subject obtained in step S602. If the ratio is within a certain range (first range), the process proceeds to step S609. This is because since the image plane speed becomes highest immediately before a subject turns about, the current subject is likely to be a turnabout subject. If the ratio is outside the certain range (first range), the microcomputer 224 determines that the current subject is not moving at a speed close to that of the turnabout subject in the past scenes or that the current subject is not yet turning about. In this case, the process proceeds to step S611. In step S611, the microcomputer 224 (data count setting unit) keeps the number of pairs of data to be used for the post-imaging estimation process at the certain value (first certain value).

In step S609, the microcomputer 224 obtains a ratio of the smallest subject distance stored in the process for storing a scene (step S308) in the past scenes to the subject distance of the current subject obtained in step S603. If the ratio is outside a certain range (second range), the microcomputer 224 determines that the current subject is not moving in a similar manner to the turnabout subject in the past scenes or that the current subject is not yet turning about. The process then proceeds to step S611. In step S611, the microcomputer 224 keeps the number of pairs of data to be used for the post-imaging estimation process at the certain value (first certain value).

If the ratio of the smallest subject distance of the turnabout subject in the past scenes to the subject distance of the current subject is within the certain range (second range), the process proceeds to step S610. The microcomputer 224 decreases the number of pairs of data to be used for the post-imaging estimation process from the certain value (first certain value). This is because, as a result of the determinations made by the microcomputer 224 in steps S606 to S609, it has been determined that the current subject is a fast-moving turnabout subject as with the subject in the past scenes and turning about.

A reason why the microcomputer 224 decreases the number of pairs of data to be used for the post-imaging estimation process from the certain value (first certain value) when a fast-moving turnabout subject is turning about is as follows.

In order for the imaging lens 201 to accurately track the subject, it is important to estimate the movement of the subject in advance. A possible large error in the estimation needs to be avoided especially when the subject is moving extremely fast, since the amount of driving of the imaging lens 201 in unit time is large. Because a subject that is turning about is moving differently than before, however, if the image plane position corresponding to the subject position is estimated using a large number of pairs of data regarding the movement of the subject so far, the error in the estimation becomes large, thereby making it difficult for the imaging lens 201 to track the change in a moving direction of the subject. By estimating the image plane position corresponding to the subject position using only recent data, the number of pairs of which is smaller than the certain value (first certain value), therefore, the image plane position corresponding to a position of the fast-moving turnabout subject at a time of an imaging operation can be estimated more accurately.

If the conditions in steps S606 to S609 are not satisfied, on the other hand, the subject might be moving slowly or moving differently than before. In this case, accurate estimation can be performed by setting the number of pairs of data (the image plane position corresponding to the subject position and the time at which the image plane position has been detected in the past in a current scene) to the certain value (first certain value).

After the process proceeds from step S604 to step S605, the microcomputer 224 determines whether a certain period of time (a fourth certain period of time) has elapsed since the number of pairs of data decreased from the certain value. If the certain period of time has not elapsed, it is assumed that the subject has not completely turned about (has not reversed its movement direction). The process proceeds to step S611, and the microcomputer 224 keeps the number of pairs of data to be used for the post-imaging estimation process smaller than the certain value. If the certain period of time has elapsed (YES in S605), it is assumed that the subject has turned about (reversed or changed direction of movement) and the movement has become stable. The process proceeds to step S611, and the microcomputer 224 increases the number of pairs of data to be used for the post-imaging estimation process to the certain value (first certain value).

The certain value (first certain value) used for the number of pairs of data to be used for the post-imaging estimation process may be a fixed value, or may vary, for example, depending on the image plane speed. When the certain value varies, the number of pairs of data to be used for the post-imaging estimation process set in step S610 is smaller than the certain value in step S611.

Advantageous Effects Produced by Second Pre-Estimation Process

In the second pre-estimation processing, data (the highest image plane speed and the smallest subject distance) regarding the past scenes and the image plane position corresponding to a position of the current subject and the subject distance are compared with each other. The number of pairs of data (the image plane position corresponding to the subject position and the time at which the image plane position has been detected) to be used for the post-imaging process is then set to the certain value (first certain value) or a value smaller than the certain value in accordance with a result of the comparison.

By setting the number of pairs of data (the image plane position corresponding to the subject position and the time at which the image plane position has been detected) to be used for the post-imaging estimation process when a fast-moving turnabout subject is turning about smaller than the certain value, the image plane position corresponding to the subject position at a time of an imaging operation can be estimated more accurately in the post-imaging estimation process.

Since it is determined in the second pre-estimation process whether the current subject is turning about by referring to the data regarding the turnabout subjects in the past scenes, a turnabout of a subject moving in a similar manner as a subject in a past scene can be detected promptly. As a result, the number of pairs of data to be used for the estimation can be accurately set in accordance with the movement of the subject.

As described above, since an accurate estimation can be performed in the post-imaging estimation process due to the second pre-estimation process, the imaging lens 201 can track the subject more accurately.

Process for Storing Scene

Next, an operation example of the process for storing a scene in step S308 will be described with reference to a flowchart of FIG. 8. The scene refers to, as described above, a period of time for which the SW1 remains ON. In the process for storing a scene, when a subject tracked by the imaging lens 201 in a current scene is a fast-moving turnabout subject that satisfies a certain condition, a process for storing data regarding the subject is performed in order to use the data regarding the subject in continuous imaging in a later scene. The image plane position corresponding to the subject position in the scene and the time at which the image plane position has been detected are stored in the memory 221 in step S302 (process for detecting the focus).

In step S801, the microcomputer 224 determines whether a difference between a scene start time and a scene end time is equal to or larger than a threshold (seventh certain value). The scene start time refers to a time at which the SW1 has been turned ON, and the scene end time refers to a time at which the SW1 has been turned OFF. If the time difference is smaller than the threshold, the process for storing a scene ends. When the time difference is smaller than the threshold, a period of time for which the subject has been tracked is short. In this case, since sufficient data is not obtained, data is not stored. If the time difference is equal to or larger than the threshold, it is determined that focus detection has been performed for a sufficient length of time, and the process proceeds to step S802.

In step S802, the microcomputer 224 determines whether, among a plurality of image plane positions corresponding to subject positions obtained in a plurality of processes for detecting the focus in the current scene, there is an image plane position corresponding to the subject position closer to the camera than image plane positions corresponding to the subject positions at the scene start time and the scene end time are. That is, the microcomputer 224 determines whether there is an image plane position corresponding to the subject position closer to the camera than image plane positions corresponding to the subject positions based on a result of a first process for detecting the focus and a result of a last process for detecting the focus among results of the repeated process for detecting the focus are. If there is an image plane position corresponding to the subject position closer to the camera than the image plane positions corresponding to the subject positions at the scene start time and the scene end time are, the subject is moving towards the camera and then moving away from the camera in the scene. The process proceeds to step S803. If there is no image plane position corresponding to the subject position closer to the camera than the image plane positions corresponding to the subject positions at the scene start time and the scene end time are, the process for storing a scene ends.

In step S803, the microcomputer 224 searches for the highest image plane speed in the scene. The microcomputer 224 searches the image plane speeds stored in the memory 221 in step S602 for the highest image plane speed. If it is known that the subject is moving towards the camera and then moving away from the camera in the scene, the microcomputer 224 may search only a period of time for which the subject is approaching for the highest image plane speed.

In step S804, the microcomputer 224 searches for the smallest subject distance (first distance) in the scene as in step S803.

In step S805, the microcomputer 224 determines whether the highest image plane speed obtained in step S803 is equal to or higher than a threshold (sixth certain value). If the highest image plane speed is equal to or higher than the threshold, the process proceeds to step S806.

In step S806, the microcomputer 224 associates the highest image plane speed obtained in step S803 with the scene and stores the highest image plane speed in the memory 221. In step S807, the microcomputer 224 associates the smallest subject distance with the scene and stores the smallest subject distance in the memory 221. This is because it is determined as a result of steps S802 and S805 that the subject tracked by the imaging lens 201 in the scene is a fast-moving turnabout subject.

The results associated with the scene and stored in the memory 221 in steps S806 and S807 are used for the determination in step S607 in the second pre-estimation process. Subjects that have achieved the highest image plane speed and the smallest subject distance in the process for storing a scene are fast-moving turnabout subjects. By comparing the turnabout subjects in the past scenes in step S607 in the second pre-estimation process with the subject in the current scene, therefore, it is determined whether the current subject is a turnabout subject.

Although both the image plane speed and the subject distance are taken into consideration in the second pre-estimation process and the process for storing a scene described above, only the image plane speed may be taken into consideration. The estimation becomes more accurate if the subject distance is taken into consideration, but even if the subject distance is not taken into consideration, it is possible to determine that the subject is a fast-moving turnabout subject by taking into consideration only the image plane speed. If the subject distance is not taken into consideration, the amount of processing performed by the microcomputer 224 can be reduced.

The data (the highest image plane speed and the smallest subject distance) regarding the past scenes stored in the memory 221 is reset, for example, when the power supply 232 is turned OFF. All the data regarding the past scenes may be stored until the power supply 232 is turned OFF and the data is reset, or a certain upper limit may be provided for the number of pairs of data and older data may be overwritten with newer data.

Furthermore, although the highest image plane speed (first speed) of the subject is stored in step S803, a speed immediately before the highest image plane speed is reached may be stored in the memory 221 and used in step S608, instead. Similarly, a subject distance immediately before the smallest subject distance is reached may be stored in the memory 221 and used in step S609, instead.

Third Pre-Estimation Process

Figure 7:
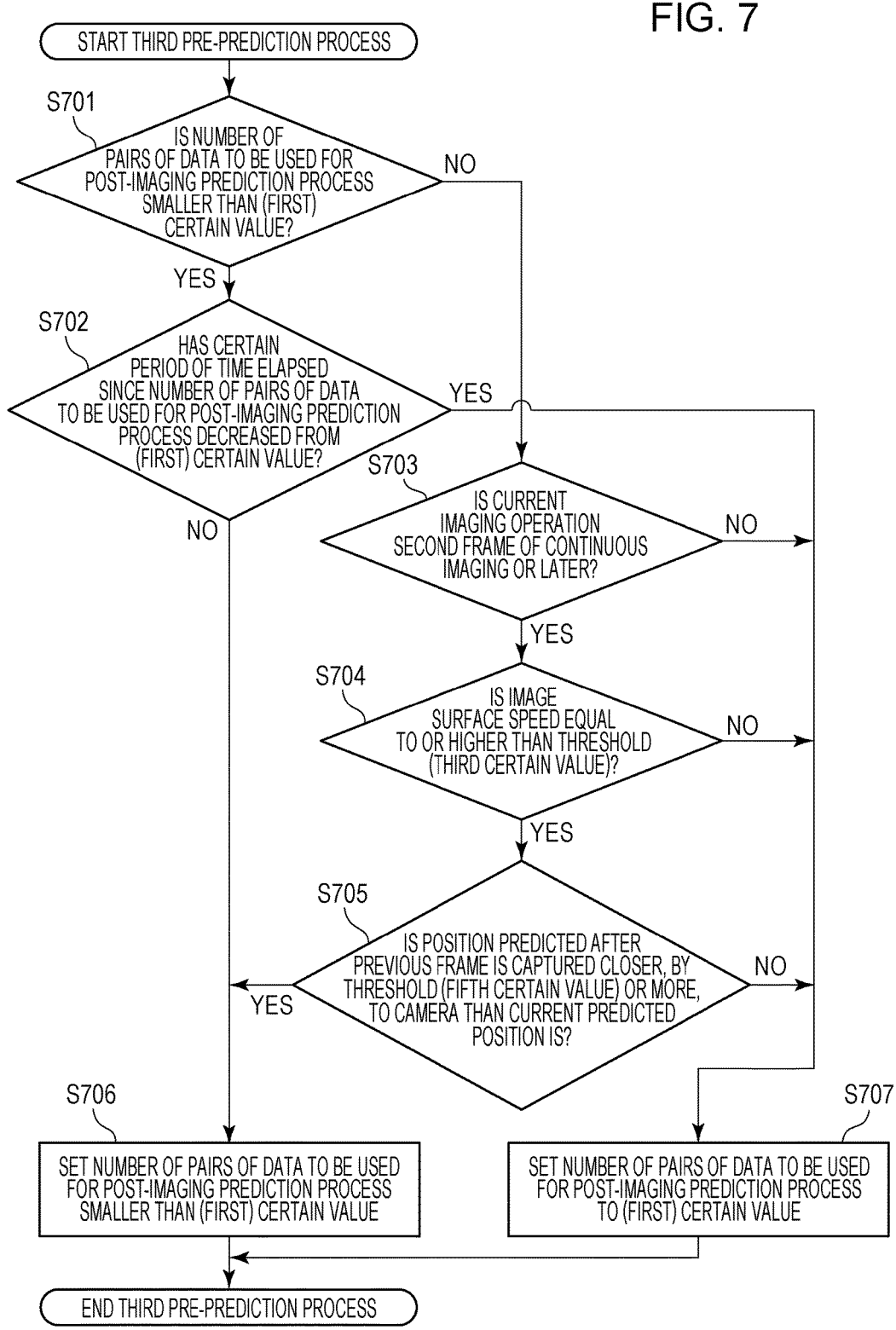
FIG. 7 is a flowchart illustrating a third pre-estimation process according to the first embodiment.

Next, an operation example of the third pre-estimation process in step S403 will be described with reference to the sub-flowchart of FIG. 7. The third pre-estimation process is, as with the second pre-estimation process, performed for the post-imaging estimation process. In the third pre-estimation process, as in the second pre-estimation process, the number of pairs of past data (the image plane position corresponding to the subject position and the time at which the image plane position has been detected in the past in the current scene) to be used for the estimation in the post-imaging estimation process is determined.

In step S701, as in step S604 in the second pre-estimation process, the microcomputer 224 determines whether the number of pairs of data to be used for the post-imaging estimation process has been set smaller than the certain value (first certain value). If the number of pairs of data has been set smaller than the certain value, the process proceeds to step S702. In step S702, as in step S605 in the second pre-estimation process, the microcomputer 224 determines whether the certain period of time (the fourth certain period of time) has elapsed since the number of pairs of data has been decreased from the certain value. If the certain period of time has not elapsed, the process proceeds to step S706, and the microcomputer 224 keeps the number of pairs of data to be used for the post-imaging estimation process smaller than the certain value. If the certain period of time has elapsed, the process proceeds to step S707, and the microcomputer 224 increases the number of pairs of data to be used for the post-imaging estimation process to the first certain value.

After the process proceeds from step S701 to step S703, the microcomputer 224 determines whether the current imaging operation is a second frame of continuous imaging or later. If the current imaging operation is the second frame of continuous imaging or later, the process proceeds to step S704. If not, the process proceeds to step S707. In step S707, the microcomputer 224 keeps the number of pairs of data to be used for the post-imaging estimation process at the certain value (first certain value).

If the microcomputer 224 determines in step S703 that the current imaging operation is the second frame of continuous imaging or later, the microcomputer 224, in step S704, determines whether the image plane speed is equal to or higher than the threshold (third certain value). If the image plane speed is equal to or higher than the threshold, the process proceeds to step S705. If not, the process proceeds to step S707. In step S707, the microcomputer 224 keeps the number of pairs of data to be used for the post-imaging estimation process at the certain value (first certain value). A reason why it is determined whether the current imaging operation is the second frame of continuous imaging or later is that a result of estimation in the post-imaging estimation process performed after an operation for capturing a previous frame and a result of estimation in the pre-imaging estimation process for the current frame are compared with each other in step S705, which will be described hereinafter. In a first frame, there is no result of estimation in the post-imaging estimation process for a previous frame, and comparison is not performed.

In step S705, the microcomputer 224 compares an image plane position (estimated image plane position 1) at a time of the capture of the current frame estimated in the post-imaging estimation process performed after the previous frame is captured and an image plane position (estimated image plane position 2) at the time of the capture of the current frame estimated in the current pre-imaging estimation process with each other. If the estimated image plane position 1 is closer, by a threshold (fifth certain value) or more, to the camera than the estimated image plane position 2 is, the process proceeds to step S706, and the microcomputer 224 decreases the number of pairs of data (the image plane position corresponding to the subject position and the time at which the image plane position has been detected) to be used for the post-imaging estimation process in step S501 from the certain value (first certain value). This is because when the estimated image plane position 1 is closer, by the threshold or more, to the camera than the estimated image plane position 2 is, the moving speed of the subject is decreasing, and it is estimated that the subject is turning about. The image plane position corresponding to the position of the fast-moving turnabout subject, therefore, can be accurately estimated using the latest piece of past data (the image plane position corresponding to the subject position and the time at which the image plane position has been detected). It is to be noted that the estimated image plane position 1 and the estimated image plane position 2 may be different from each other by the threshold or more, and the data regarding the position closer to the camera need not necessarily be used. As far as the difference is concerned, not only an turnabout subject moving towards the camera but also a turnabout subject moving away from the camera can be detected.

On the other hand, if, in step S705, the estimated image plane position 1 is not closer, by the threshold (fifth certain value) or more, to the camera than the estimated image plane position 2 is, the process proceeds to step S707. In step S707, the microcomputer 224 keeps the number of pairs of data (the image plane position corresponding to the subject position and the time at which the image plane position has been detected) to be used for the post-imaging estimation process in step S501 at the certain value (first certain value).

Advantageous Effects Produced by Third Pre-Estimation Process

As described above, in the third pre-estimation process, a result of a current post-imaging estimation process (estimated image plane position 1) and a result of a next pre-imaging estimation process (estimated image plane position 2) are compared with each other to determine whether a subject is turning about. The number of pairs of data to be used for the post-imaging estimation process is set at the certain value (first certain value) or a value smaller than the certain value in accordance with a result of the determination.

As described above, the difference between the estimated image plane position 1 and the estimated image plane position 2 is caused when the subject is slowing down to turn around or change direction. That is, since it is possible to detect that the moving direction of the subject is about to change before the moving direction actually changes, the number of pairs of data to be used for the post-imaging estimation process can be accurately set in accordance with the movement of the subject. As a result, an accurate estimation can be performed in the post-imaging estimation process.

In addition, whereas the data regarding the past scenes needs to be stored in the second pre-estimation process, an estimation can be performed in the third pre-estimation process even if data regarding corresponding past scenes (past continuous imaging) is not stored.

As described above, as a result of the third pre-estimation process, an accurate estimation can be performed in the post-imaging estimation process, and the imaging lens 201 can track the subject more accurately.

Relationship Between Second Pre-Estimation Process and Third Pre-Estimation Process A relationship between the second pre-estimation process and the third pre-estimation process will be described hereinafter. Both these processes are processes for determining the number of pairs of data to be used for the post-imaging estimation process.

When the number of pairs of data to be used for the post-imaging estimation process is decreased from the certain value (first certain value) in either of these processes, the number of pairs of data remains smaller than the certain value until the certain period of time (the fourth certain period of time) elapses. When the certain period of time has elapsed since the number of pairs of data was decreased from the certain value, the number of pairs of data is increased to the certain value. This is achieved by steps S604 and S605 illustrated in FIG. 6 or steps S701 and S702 illustrated in FIG. 7.

It is to be noted that the threshold (third certain value) for the image plane speed in step S606 in the second pre-estimation process and the threshold (third certain value) for the image plane speed in step S704 in the third pre-estimation process may be different from each other.

Advantageous Effects Produced by First Embodiment

As described above, according to the first embodiment, the imaging lens 201 can accurately track a fast-moving turnabout subject in continuous imaging. This is because the number of pairs of data to be used for the post-imaging estimation process can be accurately determined as a result of the second pre-estimation process and the third pre-estimation process.

As a result, it is possible to accurately bring a moving subject into focus during continuous imaging.

Second Embodiment

In the first embodiment, the results of the second pre-estimation process and the third pre-estimation process are applied to the post-imaging estimation process. In the second embodiment, the results of the second pre-estimation process and the third pre-estimation process are applied to the pre-imaging estimation process. As an example, in the second embodiment, the results of the second pre-estimation process, not the first pre-estimation process, are applied to the pre-imaging estimation process, and the results of the third pre-estimation process are applied to the post-imaging estimation process.

Description of the same points as in the first embodiment is omitted, and differences will be focused upon in the following description.

The operation example of the imaging process according to the first embodiment illustrated in FIG. 3 holds true in the second embodiment. The sub-flowchart of FIG. 4, which illustrates the pre-imaging estimation process (step S303) illustrated in FIG. 3, however, needs to be modified. Since the first pre-estimation process is not performed in the present embodiment, step S400 is omitted.

In the present embodiment, the results of the second pre-estimation process (step S401) are applied to the pre-imaging estimation process (step S402). The second pre-estimation process, therefore, needs to be performed before the pre-imaging estimation process. The sub-flowchart (FIG. 6) for the second pre-estimation process (step S401) is the same as in the first embodiment, except for steps S604 and S605 (described later). A certain value (second certain value) for the number of pairs of data to be used for the pre-imaging estimation process in the present embodiment may be different from the certain value (first certain value) for the number of pairs of data to be used for the post-imaging estimation process.

Figure 5:
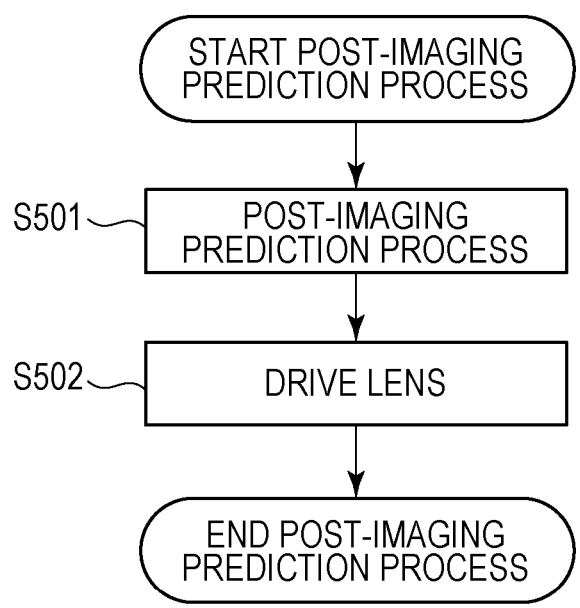
FIG. 5 is a flowchart illustrating a post-imaging estimation process according to the first embodiment.

In the present embodiment, the results of the third pre-estimation process (step S403) are applied to the post-imaging estimation process (step S501 illustrated in FIG. 5). The third pre-estimation process, therefore, needs to be performed before the post-imaging estimation process. The sub-flowchart (FIG. 7) for the third pre-estimation process is the same as in the first embodiment.

Relationship Between Second Pre-Estimation Process and Third Pre-Estimation Process in Second Embodiment A relationship between the second pre-estimation process and the third pre-estimation process will be described hereinafter. In the first embodiment, the second pre-estimation process and the third pre-estimation process are both processes for determining the number of pairs of data to be used for the post-imaging estimation process. In the present embodiment, however, the results of the second pre-estimation process are applied to the pre-imaging estimation process, and the results of the third pre-estimation process are applied to the post-imaging estimation process. In this case, steps S604, S605, S610, and S611 illustrated in FIG. 6 are determinations relating to the pre-imaging estimation process, not the post-imaging estimation process.

Advantageous Effects Produced by Second Embodiment

By applying the results of the second pre-estimation process and the third pre-estimation process to the pre-imaging estimation process and the post-imaging estimation process, respectively, the imaging lens 201 can accurately track the subject in the pre-imaging estimation process as well as in the post-imaging estimation process. This is because, since the imaging lens 201 can accurately track a fast-moving turnabout subject, the number of pairs of data to be used for the post-imaging estimation process can be accurately determined in the second pre-estimation process and the third pre-estimation process.

Modifications

Although a case in which imaging for obtaining recorded images has been assumed in the first and second embodiments, imaging need not be performed. By driving the imaging lens 201 on the basis of results of pre-imaging estimation and post-imaging estimation, trackability for a moving subject (especially a turnabout subject) improves even if imaging for obtaining recorded images is not performed. Trackability also improves, for example, even when live view is performed using an imaging device for performing so-called "imaging surface phase difference autofocus (AF)".

Although the embodiments of the present invention have been described as being applicable to specific imaging apparatuses and a control method thereof, the present invention is not limited to these embodiments, and may be modified or altered in various ways without deviating from the scope thereof.

According to the present invention, an imaging lens can track a moving object more accurately during continuous imaging.

Other Embodiments

Certain aspects of the embodiment(s) of the present invention can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2015-164015, filed Aug. 21, 2015, which is hereby incorporated by reference herein in its entirety.

What is claimed is:

1. An imaging apparatus that performs continuous imaging, in which a plurality of imaging operations are successively performed, the imaging apparatus comprising:
   a focus detection unit configured to perform focus detection, in which an amount of defocus is detected;
   a position detection unit configured to detect an image plane position corresponding to a subject position using the amount of defocus;

an estimation unit configured to estimate a next image plane position using a plurality of pairs of data regarding the image plane position and a respective time at which the amount of defocus has been detected; and a turnabout determination unit configured to determine whether a subject is a turnabout subject, which is a subject that moves towards the imaging apparatus, changes direction of movement, and then moves away from the imaging apparatus, wherein, if the turnabout determination unit determines that the subject is a turnabout subject, the estimation unit sets a number of pairs of data to be used for the estimation of the next image plane position to a number smaller than when the turnabout determination unit has determined that the subject is not a turnabout subject.

2. The imaging apparatus according to claim 1, further comprising:

a speed detection unit configured to detect an image plane speed corresponding to a speed of movement the subject; and a storage unit configured to store, as a first speed, a higher one of a plurality of image plane speeds at times of a plurality of successive operations of the focus detection in a period in which a first control member is operated, wherein, if a ratio of the first speed at a time of one of the plurality of successive operations of the focus detection in a past image plane speed in which the first control member is operated to a current image plane speed is within a first range, the estimation unit sets the number of pairs of data to be used for the estimation of the next image plane position smaller than when the ratio is outside the first range.

3. The imaging apparatus according to claim 2, further comprising:

a second estimation unit configured to estimate, after a first imaging operation but before the focus detection immediately before a second imaging operation, which is an imaging operation performed after the first imaging operation, an image plane position at a time of the second imaging operation using a plurality of pairs of data regarding the image plane position and the time, wherein the first imaging operation and the second imaging operation are imaging operations during the continuous imaging, wherein the focus detection unit performs the focus detection before each imaging operation during the continuous imaging, and wherein, if the ratio of the first speed at the time of one of the plurality of successive operations of the focus detection in the past in which the first control member is operated to the current image plane speed is within the first range, the second estimation unit sets the number of pairs of data to be used for the estimation of the next image plane position smaller than when the ratio is outside the first range.

4. The imaging apparatus according to claim 3, wherein, if a ratio of the first speed at a time of one of the plurality of successive operations of the focus detection in the past in which the first control member is operated to an image plane speed at a time of the focus detection before the first imaging operation during current continuous imaging is within the first range, the second estimation unit sets the number of pairs of data to be used for the estimation of the next image plane position smaller than a first certain value and, if the ratio is outside the first range, the second estimation unit sets the number of pairs of data to be used for the estimation of the next image plane position to the first certain value.

5. The imaging apparatus according to claim 2, wherein, if the first speed is equal to or higher than a sixth certain value, the storage unit stores the first speed.

6. The imaging apparatus according to claim 5, wherein, if, among image plane positions at the times of the plurality of successive operations of the focus detection performed in the period in which the first control member is operated, there is an image plane position closer to the imaging apparatus than image plane positions at times of a first operation and a last operation of the focus detection are, the storage unit stores the first speed.

7. The imaging apparatus according to claim 4, further comprising:

a distance detection unit configured to detect a subject distance, wherein the storage unit stores a smallest subject distance, which is a smallest one of a plurality of subject distances at the times of the plurality of successive operations of the focus detection in the past in which the first control member is operated, and wherein, if a ratio of a subject distance at the time of the focus detection before the first imaging operation to the smallest subject distance is within a second range, the second estimation unit sets the number of pairs of data to be used for the estimation of the next image plane position smaller than the first certain value, and if the ratio is outside the second range, the second estimation unit sets the number of pairs of data to be used for the estimation of the next image plane position to the first certain value.

8. The imaging apparatus according to claim 4, wherein, if the image plane speed at the time of the focus detection before the first imaging operation is lower than a third certain value, the second estimation unit sets the number of pairs of data to be used for the estimation of the next image plane position to the first certain value.

9. The imaging apparatus according to claim 4, further comprising:

a first estimation unit configured to estimate the image plane position at the time of the second imaging operation using the plurality of pairs of data after the focus detection immediately before the second imaging operation but before the second imaging operation, wherein, if a difference between the image plane position at the time of the second imaging operation estimated by the first estimation unit and the image plane position at the time of the second imaging operation estimated by the second estimation unit is equal to or larger than a fifth certain value, the first estimation unit sets the number of pairs of data to be used for the estimation of the next image plane position smaller than the first certain value, and if the difference is smaller than the fifth certain value, the first estimation unit sets the number of pairs of data to be used for the estimation of the next image plane position to the first certain value.

10. The imaging apparatus according to claim 9, wherein, if a fourth certain period of time has elapsed since the number of pairs of data was set smaller than the first certain value, the first estimation unit sets the number of pairs of data to be used for the estimation of the next image plane position to the first certain value.

11. The imaging apparatus according to claim 5,
wherein the first speed is a highest image plane speed, which is a highest one of the plurality of image plane speeds at the times of the plurality of successive operations of the focus detection in the period in which the first control member is operated.

12. The imaging apparatus according to claim 1, further comprising:
a focus detection unit configured to perform focus detection, in which the amount of defocus is detected, wherein the focus detection unit performs the focus detection before each imaging operation during the continuous imaging;
a position detection unit configured to detect the image plane position corresponding to the subject position using the amount of defocus;
a second estimation unit configured to estimate, after a first imaging operation but before the focus detection immediately before a second imaging operation, which is an imaging operation performed after the first imaging operation, an image plane position at a time of the second imaging operation using a plurality of pairs of data regarding the image plane position and the time at which the amount of defocus has been detected; and
a first estimation unit configured to estimate the image plane position at the time of the second imaging operation using the plurality of pairs of data after the focus detection immediately before the second imaging operation but before the second imaging operation,
wherein the first imaging operation and the second imaging operation are imaging operations during the same continuous imaging, and
wherein the second estimation unit sets the number of pairs of data to be used for the estimation of the next image plane position based on a difference between a result of the estimation performed by the first estimation unit and a result of the estimation performed by the second estimation unit.

13. The imaging apparatus according to claim 12,
wherein, if a difference between the image plane position at the time of the second imaging operation estimated by the second estimation unit and the image plane position at the time of the second imaging operation estimated by the first estimation unit is equal to or larger than a fifth certain value, the second estimation unit sets the number of pairs of data to be used for the estimation of the next image plane position smaller than the first certain value, and if the difference is smaller than the fifth certain value, the second estimation unit sets the number of pairs of data to be used for the estimation of the next image plane position to the first certain value.

14. The imaging apparatus according to claim 13,
wherein, if the image plane position at the time of the second imaging operation estimated by the second estimation unit is closer, by the fifth certain value or more, to the imaging apparatus than the image plane position at the time of the second imaging operation estimated by the first estimation unit is, the second estimation unit sets the number of pairs of data to be used for the estimation of the next image plane position smaller than the first certain value, and if the image plane position at the time of the second imaging operation estimated by the second estimation unit is not closer, by the fifth certain value or more, to the imaging apparatus than the image plane position at the time of the second imaging operation estimated by the first estimation unit is, the second estimation unit sets the number of pairs of data to be used for the estimation of the next image plane position to the first certain value.

15. The imaging apparatus according to claim 13, further comprising:
a speed detection unit configured to detect an image plane speed corresponding to a speed of the subject,
wherein, if an image plane speed at a time of the focus detection before the first imaging operation is equal to or higher than a third certain value, the second estimation unit sets the number of pairs of data to be used for the estimation of the next image plane position smaller than the first certain value, and if the image plane speed is lower than the third certain value, the second estimation unit sets the number of pairs of data to be used for the estimation of the next image plane position to the first certain value.

16. The imaging apparatus according to claim 12,
wherein, if a fourth certain period of time has elapsed since the number of pairs of data was set smaller than the first certain value, the second estimation unit sets the number of pairs of data to be used for the estimation of the next image plane position to the first certain value.

17. The imaging apparatus according to claim 12, further comprising:
a storage unit configured to store, as a first speed, a higher one of a plurality of image plane speeds at times of a plurality of successive operations of the focus detection in a period in which the first control member is operated,
wherein, if a ratio of the first speed to the image plane speed at a time of the focus detection before the first imaging operation is within a first range, the first estimation unit sets the number of pairs of data to be used for the estimation of the next image plane position smaller than when the ratio is outside the first range.

18. The imaging apparatus according to claim 17,
wherein, if the ratio of the first speed to the image plane speed at the time of the focus detection before the first imaging operation is within the first range, the first estimation unit sets the number of pairs of data to be used for the estimation of the next image plane position smaller than a second certain value, and if the ratio is outside the first range, the second estimation unit sets the number of pairs of data to be used for the estimation of the next image plane position to the second certain value.

19. A method for controlling an imaging apparatus that performs continuous imaging, in which a plurality of imaging operations are successively performed, the method comprising the steps of:
performing focus detection, in which an amount of defocus is detected;
detecting an image plane position corresponding to a subject position using the amount of defocus;
estimating a next image plane position using a plurality of pairs of data regarding the image plane position and a respective time at which the amount of defocus has been detected; and
determining whether a subject is a turnabout subject, which is a subject that moves towards the imaging apparatus, changes direction of movement, and then moves away from the imaging apparatus,
wherein, if it is determined, in the determining step, that the subject is a turnabout subject, the estimating step sets a number of pairs of data to be used for the estimating of the next plane to a number smaller than when the determining step has determined that the subject is not a turnabout subject.

20. A computer-readable storage medium storing a program for causing a computer to perform a method for controlling an imaging apparatus that performs continuous imaging, in which a plurality of imaging operations are successively performed, the method comprising the steps of:
performing focus detection, in which an amount of defocus is detected;
detecting an image plane position corresponding to a subject position using the amount of defocus;
estimating a next image plane position using a plurality of pairs of data regarding the image plane position and a respective time at which the amount of defocus has been detected; and
determining whether a subject is a turnabout subject, which is a subject that moves towards the imaging apparatus, changes direction of movement, and then moves away from the imaging apparatus,
wherein, if it is determined, in the determining step, that the subject is a turnabout subject, the estimating step sets a number of pairs of data to be used for the estimating of the next plane to a number smaller than when the determining step has determined that the subject is not a turnabout subject.

21. An imaging apparatus that performs continuous imaging, in which a plurality of imaging operations are successively performed, the imaging apparatus comprising:
a focus detection unit configured to perform focus detection and to calculate an amount of defocus;
a position detection unit configured to detect an image plane position corresponding to a subject position using the amount of defocus;
a speed detection unit configured to detect an image plane speed corresponding to a speed of the subject;
a storage unit configured to store, as a first speed, a higher one of a plurality of image plane speeds at times of a plurality of successive operations of the focus detection in a period in which a first control member is operated; and
a turnabout determination unit configured to determine whether the subject is a turnabout subject, which is a subject that moves towards the imaging apparatus, changes direction of movement, and then moves away from the imaging apparatus,
wherein, if a ratio of the first speed at a time of one of the plurality of successive operations of the focus detection in the period in which the first control member is operated to a current image plane speed is within a first range, the turnabout determination unit determines that the subject is a turnabout subject, and if the ratio is outside the first range, the turnabout determination unit determines that the subject is not a turnabout subject.

22. An imaging apparatus that performs continuous imaging, in which a plurality of imaging operations are successively performed, the imaging apparatus comprising:
a focus detection unit configured to perform focus detection, in which an amount of defocus is detected, wherein the focus detection unit performs the focus detection before each imaging operation during the continuous imaging;
a position detection unit configured to detect an image plane position corresponding to a subject position using the amount of defocus;
a second estimation unit configured to estimate, after a first imaging operation but before the focus detection immediately before a second imaging operation, which is an imaging operation performed after the first imaging operation, an image plane position at a time of the second imaging operation using a plurality of pairs of data regarding the image plane position and a time at which the amount of defocus has been detected,
a first estimation unit configured to estimate the image plane position at the time of the second imaging operation using the plurality of pairs of data after the focus detection immediately before the second imaging operation but before the second imaging operation; and
a turnabout determination unit configured to determine whether a subject is a turnabout subject, which is a subject that moves towards the imaging apparatus, changes direction of movement, and then moves away from the imaging apparatus,
wherein the first imaging operation and the second imaging operation are imaging operations during the continuous imaging, and
wherein the turnabout determination unit determines whether the subject is a turnabout subject based on a difference between a result of the estimation performed by the first estimation unit and a result of the estimation performed by the second estimation unit.

* * * * *